…

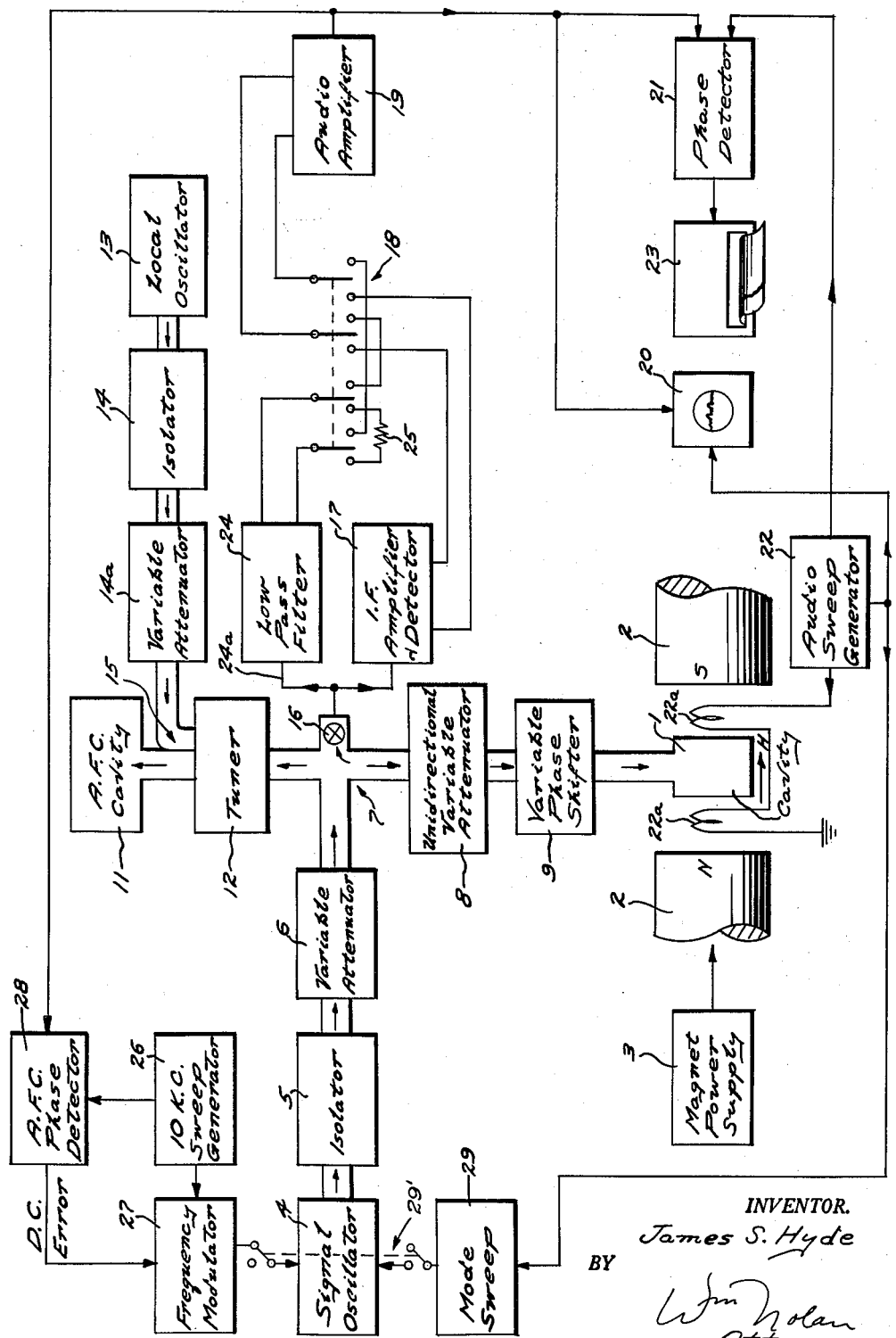

United States Patent Office 3,100,280
Patented Aug. 6, 1963

3,100,280
GYROMAGNETIC RESONANCE METHODS AND APPARATUS
James S. Hyde, Menlo Park, Calif., assignor to Varian Associates, Palo Alto, Calif., a corporation of California
Filed Oct. 25, 1960, Ser. No. 64,940
2 Claims. (Cl. 324—.5)

The present invention relates in general to gyromagnetic resonance methods and apparatus and more particularly to a novel gyromagnetic resonance spectrometer especially useful, for example, in observing gyromagnetic resonance at microwave frequencies.

Heretofore, microwave bridge networks have been utilized for the observation and measurement of gyromagnetic resonance of electrons. In the typical prior art micowave bridge, utilized for this purpose, the sample under analysis was placed in one arm thereof in a D.C. magnetic field and another arm thereof served as a reference arm such that in the presence of resonance of the electrons within the sample under analysis the bridge was unbalanced. The unbalance of the bridge was detected in a suitable crystal detector in a third arm of the bridge and displayed to indicate resonance. The limiting noise source in such spectrometers arose from the microwave crystal diode used for detection. There is a large audio frequency noise generated in these crystals which decreases with increasing frequency. For example, at 20 cycles the noise temperature (expressed as the ratio of the noise power of the crystal to the noise power of an equivalent resistor) is about 40 db, while at 100 kc., it is 4 db and at 30 mc. it is 1 db.

It is desirable to have the resonance information appear as a very high frequency alternating voltage across the crystal, for then a narrow band amplifier can be employed which does not pass low frequency noise. This can be accomplished in either of two ways. The first way is to modulate the resonance directly at a high frequency, either by amplitude or frequency modulating the signal oscillator output or, as is usual, superimpose a high frequency magnetic field modulation on the D.C. magnetic field. High frequency field modulation systems have been developed with frequencies ranging from 100 kc. to 1 mc.

The other way (superheterodyne) is to use low audio frequency magnetic field modulation of the resonance, resulting in an amplitude modulated microwave signal. This is mixed with a large local oscillator signal which is displaced in frequency an intermediate frequency away from the frequency of the signal oscillator. The result is an I.-F. carrier of the signal oscillator amplitude which is modulated at the resonance audio frequency. Following I.-F. amplification the I.-F. carrier is detected, and the audio frequency resonance signal is amplified further in the standard manner.

There are certain disadvantages to modulating the signal oscillator output and to high frequency field modulation, and also there are a number of experiments where superheterodyne detection is required.

When modulating the signal oscillator output troublesome problems are caused by variations in the source power and reflections.

For certai ninvestigations it is difficult to produce a high frequency modulated magnetic field at the sample. If modulation coils are positioned on the exterior of the sample cavity, the magnetic wall thickness of the cavity must be thin enough for the high frequency fields to penetrate. Also, either interior or exterior high frequency field modulation coils create problems at liquid helium temperature at which certain experiments are performed. If interior modulation is used with the cavity immersed in the helium, excessive helium may be boiled off, and if exterior modulation coils are used then the cavity cannot be at liquid helium temperature, since the high frequency field would not penetrate any reasonable thickness of metal at this temperature. Similar problems are encountered when it is desired to investigate a sample under high pressure. Furthermore, if either of the relaxation times $T_1$ or $T_2$ are long, such as of the order of the inverse of the modulation frequency, complicating effects are encountered.

The present invention provides a novel gyromagnetic resonance spectrometer especially useful for observing electron paramagnetic resonance and includes a novel superheterodyne detection system with a bridge which uses only one magic tee (or equivalent circuit element). More specifically, in a preferred embodiment of the present invention local oscillator power is coupled into the reference cavity arm of a conventional bridge circuit using a directional coupler. A simple switching arrangement permits one quickly to go from homodyne to superheterodyne detection without the necessity of changing any microwave circuitry.

The principal object of the present invention is to provide a novel gyromagnetic resonance spectrometer especially useful, for example, in observing gyromagnetic resonance at microwave frequencies.

One feature of the present invention is the provision of a novel microwave bridge network including a local oscillator coupled into one arm thereof by means of a directional coupler whereby the bridge may be operated for superheterodyne detection using only one magic tee.

Another feature of the present invention is the provision of a novel gyromagnetic resonance spectrometer system including a microwave bridge network having a sample under analysis disposed in the measuring arm thereof, and local oscillator power coupled into the reference arm thereof whereby the bridge may be operated for superheterodyne detection using only one magic tee.

Another feature of the present invention is the provision of a novel gyromagnetic resonance spectrometer system including a microwave bridge network having a sample under analysis disposed in the measuring arm thereof, a local oscillator coupled into the reference cavity arm thereof by means of a directional coupler, and means for switching between homodyne or superheterodyne detection without changing any microwave circuits.

Other features and advantages of the present invention will become more apparent upon a perusal of the specification taken in connection with the accompanying drawing, wherein:

The drawing is a schematic block diagram of a gyromagnetic resonance spectrometer including novel features of the present invention.

Referring now to the drawing, a sample of matter which it is desired to analyze is placed within the cavity resonator 1 and immersed in a polarizing magnetic field H produced, for example, by a magnet 2 which may be either of the permanent type or, in the preferred embodiment, of the electromagnetic type supplied with energy from a magnet power supply 3.

The cavity 1 containing this sample of matter is placed in a measuring arm of a suitable microwave bridge, the cavity being preferably placed at the end of said measuring arm. An automatic frequency control cavity 11 is disposed at the end of a reference or automatic frequency control arm of the bridge. Microwave energy is fed to the bridge from a suitable high frequency signal oscillator 4 as, for example, a klystron oscillator carried in a power arm of the bridge. Microwave energy is also fed into the bridge from a high frequency local oscillator 13 as, for example, a klystron oscillator coupled to the reference arm of the bridge. The frequency of the local oscillator 13 is displaced an intermediate frequency away from the frequency of the signal oscillator 4. A crystal detector 16 is disposed at the end of a detecting arm of the bridge and is matched thereto via a plurality of suitable matching screws, not shown.

Microwave signal oscillator energy is fed from the signal oscillator 4 via an isolator 5 and a variable attenuator 6 into measuring and frequency control arms of the microwave bridge via a hybrid tee 7. A unidirectional variable attenuator 8 is provided in the measuring arm for variably attenuating the wave energy propagating therethrough to the cavity 1. This attenuator 8 allows reflected energy from the cavity 1 to pass from the cavity 1 back to the hybrid tee 7 substantially without attenuation whereas the power level of the microwave energy applied to the cavity resonator 1 can be kept at a desirable low level as of, for example, the order of microwatts to prevent undesired saturation of the gyromagnetic bodies under analysis.

A variable phase shifter 9 is disposed between the sample cavity 1 and the unidirectional variable attenuator 8. The variable shifter 9 allows the phase of the energy supplied to and reflected from the cavity 1 to be varied as desired such that either the absorption or the dispersion mode of the sample matter under investigation may be observed.

The automatic frequency control cavity 11 is tunable and is coupled to the magic tee 7 via a waveguide tuner 12 which may comprise, for example, a waveguide slideable screw tuner. The automatic frequency control cavity 11 serves to control the frequency of the microwave source 4 in a manner which will be more fully described later. The waveguide tuner 12 reflects a certain variable controllable amount of microwave energy back to the bridge.

Microwave local oscillator energy is fed from the local oscillator 13 via an isolator 14 and a variable attenuator 14a into the reference cavity arm of the bridge by means of a directional coupler 15.

The crystal detector 16, disposed in the detecting arm of the bridge is biased into its linear range by a portion of the microwave energy reflected from the reference arm of the bridge.

The I.-F. crystal current detected in the crystal detector 16 is passed through an I.-F. amplifier and detector 17. The resonance signal detected in the I.-F. amplifier and detector 17 is then passed through a switch 18 such as a double pole double throw switch to the audio amplifier 19 where it is amplified and thence fed to the Y axis of an indicator 20 such as an oscilloscope. It is also fed to a phase sensitive detector 21 where it is demodulated by comparison with a sweep signal obtained from a sweep generator 22. The sweep generator 22 serves to sweep the sample under analysis through gyromagnetic resonance by modulating the polarizing field through the intermediary of a pair of suitable electromagnetic coils 22a. From the phase detector 21 the demodulated signal is fed to a recorder 23 where it is recorded as a function of time. The sweep signal obtained from the sweep generator 22 is also applied to the X axis of the indicator 20 to provide a display of the resonance signal.

When homodyne detection is desired, the local oscillator is turned off and the switch 18 is thrown to its other position to connect a choke circuit 24 instead of the I.-F. amplifier and detector 17 to the audio amplifier 19. Then the output of the crystal detector 16 is passed by a transmission line 24a to a low pass filter 24 which prevents transmission of the I.-F. carrier and thence to the audio amplifier 19 where it is amplified and fed on in the same manner as described above.

When the switch 18 connects the I.-F. amplifier and detector 17 to the audio amplifier 19, a resistor 25 closes the circuit containing the low pass filter 24.

In operation, microwave energy applied to the hybrid tee 7 from the signal oscillator 4 splits and one-half of the energy is propagated into the measuring arm and the other half of the energy is propagated into the reference arm. The energy that goes into the measuring arm is variably attenuated by the attenuator 8 to preferably a low power level and passed through the variable phase shifter 9 and applied to the sample to excite resonance thereof. At resonance the wave energy reflected from the cavity will vary in phase and magnitude with resonance of the sample. The varying reflected microwave energy, indicative of resonance, is propagated back through the measuring arm to the hybrid tee 7 where a portion thereof is applied to the crystal detector 16.

A portion of the microwave energy propagated into the reference arm is reflected back to the hybrid tee 7 and into the crystal detector 13 where it is mixed with reflected energy from the sample of matter under investigation to produce a D.C. signal which is modulated at an audio frequency in variable accordance with the resonance of the sample. During superheterodyne detection a portion of the microwave energy fed into the reference arm from the local oscillator 13 also passes into the detecting arm of the bridge. At the crystal detector 16 this local oscillator energy is mixed with the signal oscillator energy to produce an I.-F. carrier with the resonance information at a low audio frequency superimposed thereon. The I.-F. signal is fed to the I-F. amplifier and detector 17 in which the audio modulated D.C. resonance signal is detected and then fed to the audio amplifier 19 and on to the indicator 20, the phase detector 21 and the recorder 22 as described above.

When homodyne detection is used the audio modulated D.C. resonance signal is passed from the crystal detector 16 through the low pass filter 24 by the transmission line 24a and thence to the audio amplifier 19. From the audio amplifier 19 the signal is passed on in the same manner as described above with respect to superheterodyne detection.

An undesirable portion of the local oscillator energy from the reference arm and a portion of the signal oscillator energy reflected from both the reference arm and the measuring arm combine at the hybrid tee and are reflected back into the power arm of the bridge. This reflected energy is partially attenuated in variable attenuator 6 and is heavily attenuated in the isolator 5 thereby preventing the reflected power from reaching the signal oscillator 4. If this returning energy were allowed to return to the signal oscillator 4 fluctuations in the balance of the microwave bridge would present a variable load at the signal oscillator and tend to produce undesired changes in the frequency thereof. Similarly, the variable attenuator 14a and the isolator 14 prevent reflected power from reaching the local oscillator 13.

The variable attenuator 6 controls the signal oscillator power level of the bridge apparatus and is varied as desired to produce proper operation thereof. The variable attenuator 14a controls the power level of the local oscillator signal.

An automatic frequency control network is employed to maintain the signal oscillator 4 on the desired frequency selected by the automatic frequency control cavity 11. More specifically, a sweep generator 26 supplies a relatively high audio frequency sinusoidal sweep signal as of, for example, 10 kc. to a suitable frequency modulator 27 for frequency modulating the output of the signal oscillator 4 for substantially equal frequency deviations above and below the center frequency thereof. The frequency modulated output of the signal oscillator 4 is thence fed to the automatic frequency control cavity 11 which is tuned to the desired frequency of the signal oscillator 4. When the center frequency of the signal oscillator 4 is precisely at the center frequency of the automatic frequency control cavity 11 there will be energy absorbed by the cavity 11 from the signal oscillator 4 twice during each frequency modulation sweep cycle. This double absorption per sweep cycle of the signal oscillator 4 produces a strong second harmonic of the 10 kc. sweep signal in the output of the crystal detector 16. On the other hand, if the center frequency of the signal oscillator 4 is not at the center frequency of the automatic frequency control cavity 11, the cavity 11 will have only one maximum absorption from the signal oscillator 4 per cycle of the frequency modulation sweep. This means that there will be a substantial fundamental component at the frequency modulation sweep frequency produced in the output of the crystal detector 16. The phase and magnitude of this fundamental component will depend upon the sense and degree that the frequency of the signal oscillator 4 is above or below the center frequency of the automatic frequency control cavity 11. The fundamental error signal is amplified in the audio amplifier 19 and thence fed to an input of a frequency control phase sensitive detector 28 wherein it is compared with a signal derived from the 10 kc. sweep generator 26 to obtain a D.C. error signal which is applied back to the frequency modulator 27 for centering the frequency of the signal oscillator 4 with respect to the frequency of the automatic frequency cavity 11.

In a preferred embodiment of the present invention the signal oscillator 4 comprises a reflex klystron oscillator and the frequency modulator 27 comprises a reflex klystron reflector power supply which serves to vary the frequency of the reflex klystron oscillator by varying the reflector voltage. The D.C. automatic frequency control error signal serves to control the D.C. reflector voltage and the frequency modulation of the klystron oscillator is obtained by modulating the reflector supply voltage at the frequency of the sweep generator 26.

In order to facilitate mechanical tuning of the oscillators 4 and 13 to the resonant frequency of the cavity 1, a mode sweep unit 29 is provided. The audio sweep generator 22 is connected to the mode sweep 29 which applies the sinusoidal output voltage of the sweep generator 22 to the reflector of the reflex klystron signal oscillator 4. Since the output voltage of the sweep generator 22 is also applied to the X axis of the indicator 20 and since the klystron signal oscillator frequency is nearly a direct function of its reflector voltage, the indicator 20 presents a visual display of the klystron signal oscillator and cavity power modes when the mode sweep is operating. Thus, the klystron signal oscillator mechanical tuning is readily achieved by viewing the cavity absorption of the power modes on the indicator 20. When the mode sweep 29 is on, the A.F.C. system is turned off as by ganged switch 29', and during normal operation of the spectrometer device the mode sweep is turned off.

In a typical operation of a gyromagnetic resonance spectrometer utilizing this invention the signal oscillator frequency can be 9.5 kmc. and the frequency of the local oscillator 13 is 30 megacycles away from the frequency of the signal oscillator 4. The audio frequency magnetic field modulation frequency of the sweep generator 22 can be 400 cycles.

The only additional equipment required for the superheterodyne system over the conventional homodyne system is the local oscillator klystron, klystron power supply, the I.-F. amplifier and detector and a switch. The klyston power supply need only be stable enough to hold the local oscillator frequency well within the passband of the I.-F. amplifier, which is a weak requirement. With this additional equipment a standard homodyne detection system can be converted for superheterodyne detection by merely the flip of a switch without the need for changing any microwave circuitry.

Furthermore, with this switching arrangement balancing of the bridge for superheterodyne detection is greatly simplified. For superheterodyne detection the bridge is first balanced for homodyne detection. Then the switch 18 is thrown for superheterodyne detection and final adjustments made.

With the switch 18 thrown for homodyne detection and the mode sweep 29 operating, the mode sweep of the signal oscillator 4 is displayed on the indicator 20 with the local oscillator 13 turned off. The signal oscillator 4 is tuned until a dip produced by the cavity 1 appears in the center of the signal oscillator mode sweep. At this point the frequency of the signal oscillator 4 is matched to the frequency of the sample cavity 1. Then the reference cavity 11 is also tuned to the frequency of the sample cavity 1 so that two dips due to the cavities 1 and 11 coincide. Next, the local oscillator 13 is turned on and tuned until the beat between the signal oscillator 4 and the local oscillator 13 is visible on the side of the signal oscillator mode sweep displayed on the indicator 20. At this point the switch 18 is thrown to superheterodyne detection whereupon the bandpass of the I.-F. amplifier will be displayed on the indicator 20. The local oscillator 13 is then tuned until the dip produced by the cavities 1 and 11 is centered on the I.-F. bandpass. At this point the frequency of the local oscillator 13 will be exactly the intermediate frequency away from the frequency of the signal oscillator 4. The tuner 12 is then adjusted until the cavity dip reaches a minimum. The mode sweep is then turned off, the A.F.C. turned on, and the tuner 12 readjusted to obtain the desired amount of leakage to bias the I.-F. detector into its linear range. Then the spectrometer is ready for operation. The above procedure of first tuning the spectrometer for homodyne detection and then adjusting it for superheterodyne detection prevents pulling the operating frequency of the cavities and the A.F.C. system due to the local oscillator power which is typically just 30 megacycles away from the frequency of signal oscillator.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A high frequency bridge apparatus for measuring a property of a sample comprising a measuring arm wherein the sample is placed, a reference arm, a power supply arm for supplying signal oscillator power to said bridge, and a detection arm for receiving a bridge unbalancing resonance signal from said sample, means for applying local oscillator power to said bridge, first crystal detector means in said detection arm for deriving a low frequency signal in variable accordance with the unbalance of said bridge and for deriving an intermediate frequency signal with said low frequency signal superimposed thereon, means connected to said first detector means for amplifying the detected intermediate frequency signal and for detecting said low frequency signals imposed thereon, and means connected to said first detector means for selecting the low frequency signal in variable accordance with the unbalance of the bridge, and switching means for switching between said intermediate frequency amplifying and detecting means when local oscillator power is applied to said bridge, and said means for selecting the low frequency signal when no local oscillator power is applied to said bridge for superheterodyne or homodyne detection, respectively, of the resonance signal as desired with positioning of said switching means.

2. A gyromagnetic resonance spectrometer apparatus including: a microwave bridge network; said bridge network including a measuring arm having a cavity resonator disposed therein for containing therewithin a sample of matter under investigation, a power arm for supplying wave energy to said bridge network including a signal oscillator for supplying high frequency wave energy, a reference arm adapted to aid in controlling the frequency of said signal oscillator, means for selectively introducing or not high frequency wave energy local oscillator power into said bridge, said wave energy from said local oscillator being displaced an intermediate frequency away from the frequency of said signal oscillator, a detecting arm including a crystal detector means for detecting unbalance of said bridge network and for deriving an intermediate frequency signal in variable accordance with unbalance of said bridge; means connected to said crystal detector means for amplifying the detected intermediate frequency signal; second detector means connected to said intermediate frequency signal amplifying means for deriving a low frequency signal in variable accordance with the unbalance of said bridge; means for amplifying and indicating said low frequency signal; and switching means for connecting said amplifying and indicating means to said crystal detector means for homodyne detection of gyromagnetic resonance signals when no local oscillator power is introduced into said bridge network and for connecting said amplifying and indicating means to said second detecting means for superheterodyne detection of gyromagnetic resonance signals when local oscillator power is introduced into said bridge network.

References Cited in the file of this patent

Strandberg et al.: The Review of Scientific Instruments, vol. 27, No. 8, August 1956, pp. 596 to 605 inclusive.

White et al.: Physical Review, vol. 104, No. 1, October 1956, pp. 56 to 62 incl.

Hirshon et al.: The Review of Scientific Instruments, vol. 26, No. 1, January 1955, pp. 34 to 41 incl.

Misra: The Review of Scientific Instruments, vol. 29, No. 7, July 1958, pp. 590 to 594 incl.